Figure 8:
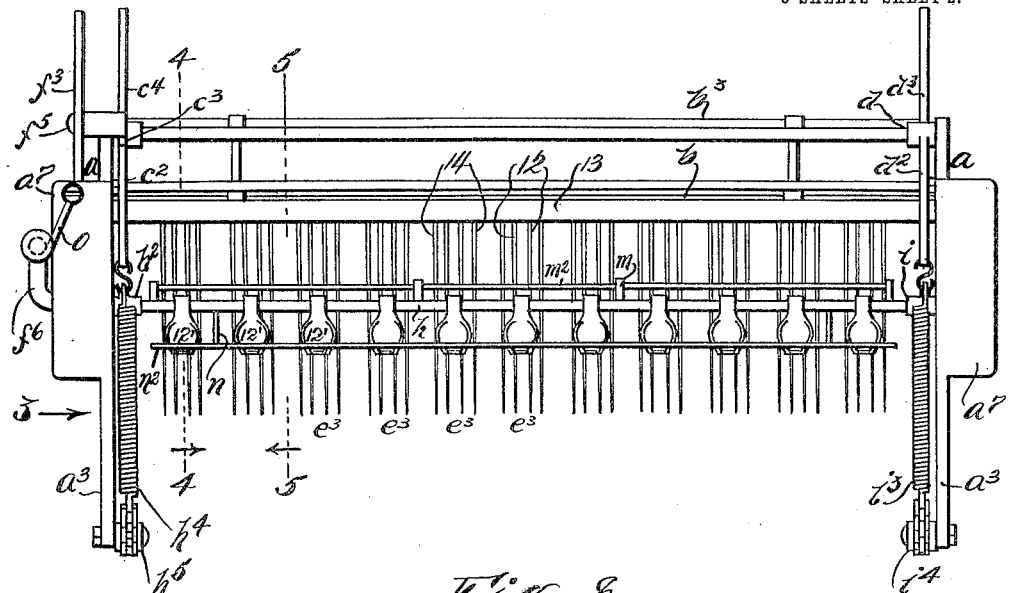

P. PANOULIAS.
MACHINE FOR COATING CONFECTIONS.
APPLICATION FILED FEB. 28, 1910. RENEWED OCT. 18, 1913.
1,082,234.  
Patented Dec. 23, 1913.  
3 SHEETS—SHEET 1.
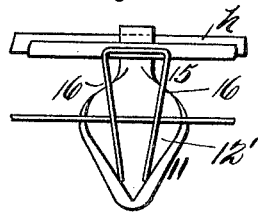
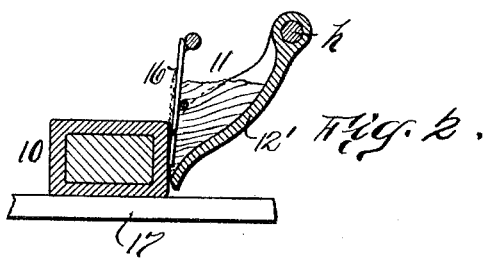
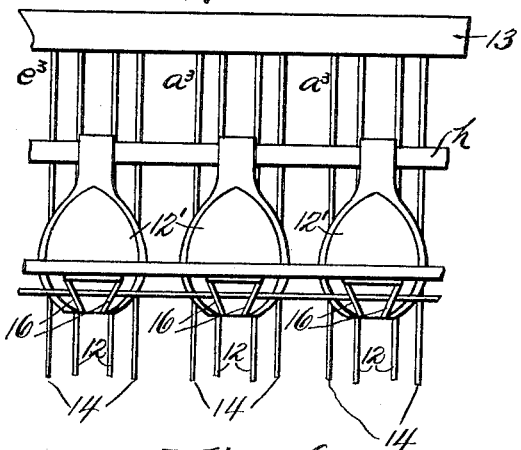
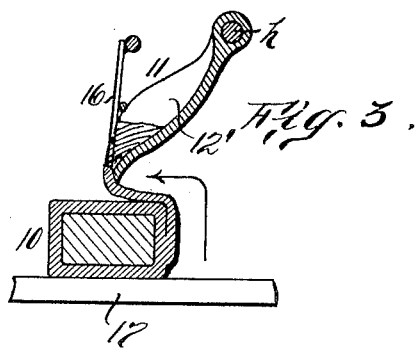
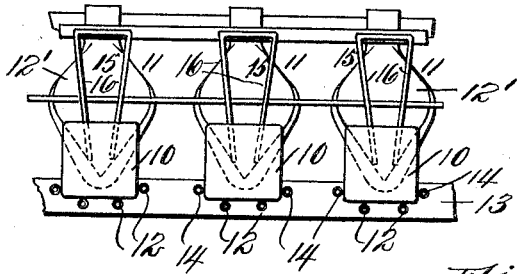
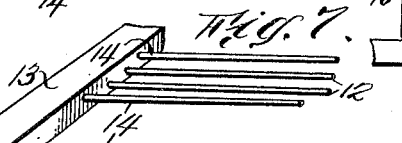
Witnesses:  
C. A. Jarvis  
Benjamin P...burg
Inventor:  
Panayiotis Panoulias.  
by Chystil and Wright  
attorneys.

P. PANOULIAS.
MACHINE FOR COATING CONFECTIONS.
APPLICATION FILED FEB. 28, 1910. RENEWED OCT. 18, 1913.

1,082,234.

Patented Dec. 23, 1913.

3 SHEETS—SHEET 2.

Witnesses:
C. A. Jarvis
Benjamin Ottenburg

Inventor:
Panayiotis Panoulias.
by Chryptic and Wright
attorneys.

P. PANOULIAS.
MACHINE FOR COATING CONFECTIONS.
APPLICATION FILED FEB. 28, 1910. RENEWED OCT. 18, 1913.
1,082,234.
Patented Dec. 23, 1913.
3 SHEETS—SHEET 3.
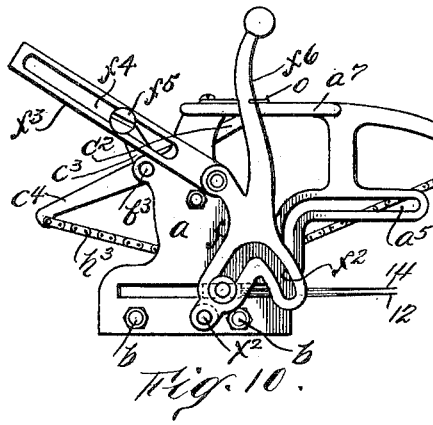
Fig. 10.
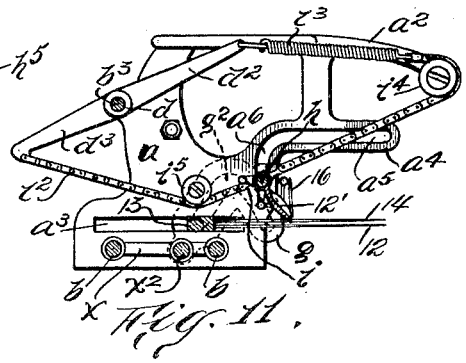
Fig. 11.
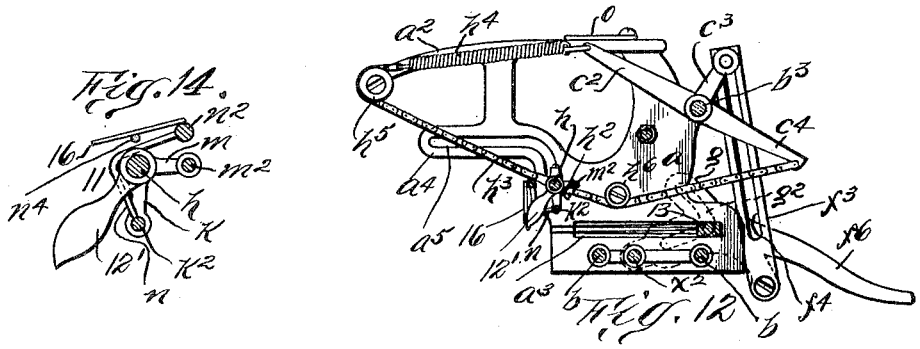
Fig. 14.
Fig. 12.
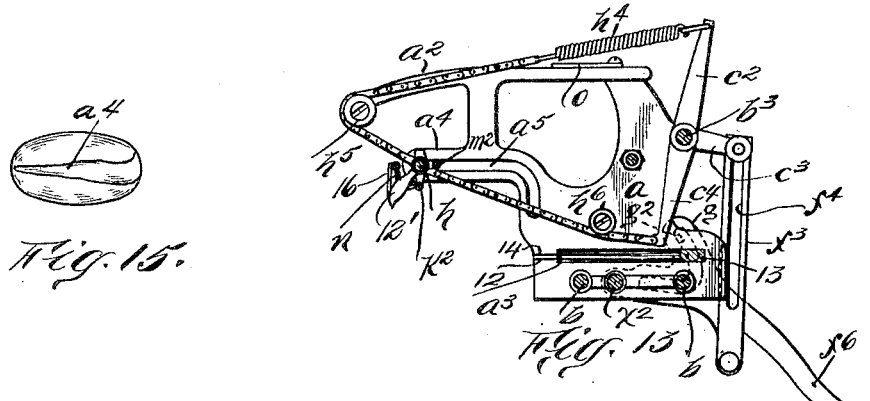
Fig. 15.
Fig. 13.
Witnesses:
C. A. Jarvis
Benjamin Oltenburg
Inventor
Panayiotis Panoulias
by Chrystie and Wright
attorneys.
COLUMBIA PLANOGRAPH CO., WASHINGTON, D. C.

UNITED STATES PATENT OFFICE.

PANAYIOTIS PANOULIAS, OF HOBOKEN, NEW JERSEY.

MACHINE FOR COATING CONFECTIONS.

1,082,234. Specification of Letters Patent. Patented Dec. 23, 1913.

Application filed February 28, 1910, Serial No. 546,512. Renewed October 18, 1913. Serial No. 796,067.

*To all whom it may concern:*

Be it known that I, PANAYIOTIS PANOULIAS, a subject of the King of Greece, residing at the city of Hoboken, in the State of New Jersey, have invented certain new and useful Improvements in Machines for Coating Confections, of which the following is a clear, full, and exact description.

The object of this invention is to provide an improved means for securing an imitation hand stroke in the manufacture of candies. In my United States Patent 663,359 I have shown one means for providing a stroke across the candy by causing a relatively movable member to contact with one side of the candy to raise a ridge or stroke up, over and across the candy. In such patent I have shown the device as applied to a basket known as a dipping frame, although the particular basket of such application is one which is adapted to be passed through a flooding machine, and not dipped down in the ordinary acceptance of the word.

In my United States Letters Patent 855,804, I have shown a cup shaped receptacle for coating, having a blade movable with relation thereto, adapted to be moved out of the way when the blade is in contact with the candy, so that the contents of the spoon may be drawn up, over and across candy to give a more definite stroke than that in my first referred to patent.

The object of the present invention is not only to secure an additional coating to be drawn up, over and across the candy after the blade has contacted with the same, but it is to secure such additional coating without the necessity of providing any additional moving member such as the blade referred to in my United States Patent 855,804. It is obvious that many various ways may be provided for leading superfluous material to the stroking blade in order that it may be added to and combine with that part of the coating of the candy which is brought into contact with the blade, and the two coatings, to wit:—the candy's coating and the additional coating drawn up, over and across the candy. Various means may be provided for supplying this extra coating material to the blades, which means will vary more or less, depending upon whether the machine is a flooding machine or is one where the article is actually dipped together with the stroking device.

While I have shown in this invention a device which is to be dipped into the tank to cause the superfluous material to be held by suitable detaining means, in a pocket, nevertheless I do not limit myself to such construction, for various other modifications can be provided, such for instance as pipe feed to the blades from an outside source, which will cause more or less chocolate to become deposited upon the blade, where it will combine with the coating of the candy after the blade has touched the same.

In the particular modification illustrated herein, I have shown a dipping frame; in this instance one which really dips, and I have provided certain coating retaining means in front of the blades, whereby I get an action quite similar to that of a fountain pen. This particular device is comprised particularly of a pair of wires mounted in front of the blade, which is in this instance in the shape of a spoon to form a pocket behind the wires, so that upon dipping the blade and wires into the melted chocolate, the pocket will be filled with candy, which will be retained behind the wires, even against the shaking operation. This blade may then be brought into contact with a candy core upon a plaque, and the blade then caused to travel up, over and across the candy after contacting with one side thereof. This causes the coating held within the spoon to be drawn out with the fountain pen action across the candy in a string to produce the desired stroke.

In my preferred form of apparatus shown herein, the stroking devices are in the form of a number of spoons in a row, against which spoons candies are placed upon pin bars, and the spoons, candies and pin bars immersed in the chocolate. The candies are then removed from the pin bars on to a stroking support and the stroking device is caused to move over the same.

My invention has also reference to an improved form of pin bars, having the pins arranged in two planes, needles of the lower plane being placed more or less centrally with relation to the stroking blades, whereby pockets or channels are formed for the candy cores to maintain them in their proper relative position to the stroking blades, and to aid the operator in placing the cores in position.

The scope of my invention will be pointed out in the claims.

Figure 9:
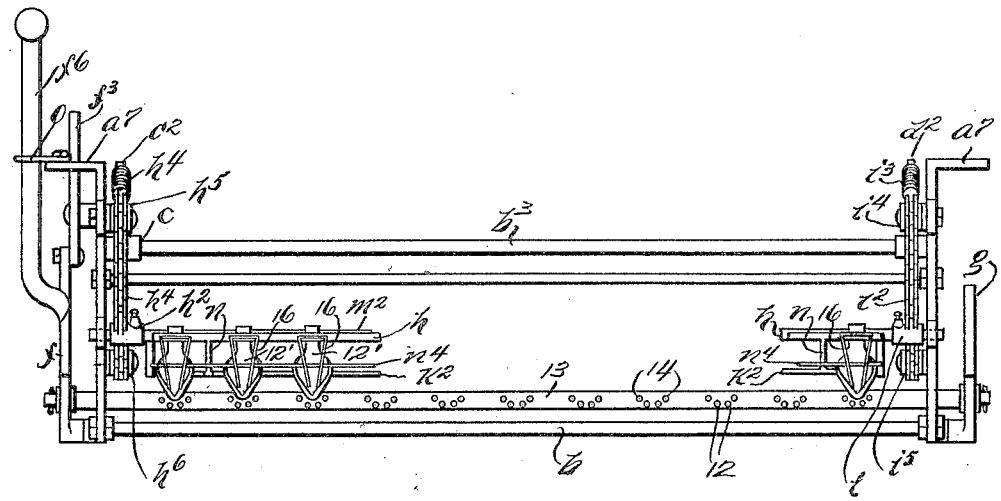

In the drawings, Figure 1 is a front view of one of the stroking devices of this application. Fig. 2 is a sectional central side view thereof, showing the device in position preparatory to beginning the stroke upon the coated candy, which is on the plaque or stroking support. Fig. 3 is a view similar to Fig. 2 with the stroking blade moving across the top of the candy. Fig. 4 is a view of the stroking blade, as it leaves the candy. Fig. 5 is a plan view of three stroking blades on my improved form of pin bar. Fig. 6 is a front elevation of the same, showing the candies in place thereon. Fig. 7 is a perspective view of two sections of the pin bar. Fig. 8 is a plan view of a complete dipping frame of the kind described in my Patent 855,804, provided with the improvements of this invention. Fig. 9 is a front view of Fig. 8 with part of the construction broken away. Fig. 10 is an end view looking in the direction of the arrow 3 of Fig. 8, showing the parts in their normal position. Fig. 11 is a transverse section on the line 4—4 of Fig. 8. Fig. 12 is a transverse section from the line 5—5 of Fig. 8, showing the parts in a different position. Fig. 13 is a view similar to Fig. 12, but showing the parts in another position. Fig. 14 is a view similar to Figs. 12 and 13, of a part of the construction shown in said figures, and showing parts thereof in a different position; and Fig. 15 is a plan view of a nut or candy core coated with chocolate by means of the modification of the dipping frames illustrated in the preceding figures.

Broadly considered, my invention will be readily understood from Figs. 1 to 7.

The candy cores 10 are placed each one in front of each of the stroking devices 11, upon pins 12 of a pin bar 13; the pins 12 are on a lower plane than are pins 14 of the pin bar, which provides a means for guiding the feeder in putting the candy cores in place and also provides a pocket to prevent the displacement of the cores during the coating operation. The stroking devices 11 are composed preferably of spoon shaped blades or spoons 12', in front of which and stationarily located with relation to the spoon, but partaking of the spoon's motion is a coating detaining device 15, composed of two parallel wires 16, running vertically to the cups and mounted on suitable cross bars to hold them always in the same position with relation to the spoons. When the candies are placed in the position of Fig. 6, the spoons and candies are immersed or are flooded with coating material, or the candies may be coated, and extra coating material supplied to the stroking devices. The candies are then moved off the needles, either by pushing them horizontally off by the spoon or by withdrawing the needles from beneath the candies, causing the coated candy cores to fall on the plaques or stroking support 17 with the stroking devices in contact with one side of the candy. The plaque or support 17 may be any wooden board, or any endless carrier provided with wax paper or the like to receive the candy, it is well known in the art. Where the stroking device contacts with the candy, it takes hold of part of the coating, combines it with the extra coating held in the spoon, and as the spoon moves up, over and across the candy in the general arc of a circle, it causes a string to be drawn across the candy to simulate a stroke.

In order that those skilled in the art may have one example of a machine which may be fitted with the improvements herein specified, I have shown in Figs. 8 to 15 the elements of my invention attached to a particular type of dipping frame, but I do not wish to be understood as limiting myself by such showing.

In the construction of my improved candy dipping and coating frame as shown in the drawings, I provide a rigid frame comprising two end plates $a$ connected by horizontal parallel bottom rods $b$ and a horizontal rod $b^2$ in the top part of the frame, and the rods $b$ are connected by cross bars and each of said end plates or members is provided in the bottom portion thereof with a horizontal slot or opening $a^3$ and at the top thereof with a forwardly directed arm $a^2$ below which is a forwardly directed arm $a^4$, and the arms $a^4$ are provided with slots $a^5$ which range forwardly and backwardly and the rear end portions of which are curved downwardly or provided with a downwardly directed extension $a^6$.

Mounted in the top back portion of the frame plates or members $a$ is a rotatable shaft $b^3$ with which is connected a forwardly and upwardly directed arm $c^2$, a backwardly and upwardly directed short arm $c^3$ and a backwardly and downwardly directed longer arm $c^4$, and connected with the opposite end of said shaft at $d$ is a forwardly and upwardly directed arm $d^2$ and downwardly and backwardly directed arm $d^3$.

Mounted in the bottom horizontal slots or openings $a^3$ in the end plates $a$ and movable forwardly and backwardly therein is a bar 13 provided with a plurality of forwardly directed pins or needles 12 and 14 and mounted in the bottom portions of the end plates or members $a$ between the rods $b$ and passing through the cross bars $x$ which connect said rods is a rotatable shaft $x^2$ to one end of which, the right hand end as shown in the drawings, is secured an arm $f$, that part of which adjacent to the shaft $x^2$ is widened and provided with an inverted V-shaped slot or opening $f^2$, and the corresponding end of the bar 13 passes through said slot or opening as clearly shown, and pivoted to the arm $f$ above the slot or opening $f^2$ is a link member $f^3$ having a longitudinal slot $f^4$ through which passes a headed pin, screw or similar device $f^5$ which is secured in the upwardly and backwardly directed arm $c^3$ of the rotatable shaft $b^3$.

The left hand end of the rotatable shaft $x^2$ is provided with a curved arm $g$ which is shown in full lines in Fig. 9 and partially in full and partially in dotted lines in Fig. 11 and which is of the same shape as that part of the arm $f$ in which the inverted V-shaped slot $f^2$ is formed, and the arm $g$ is also provided with a slot or opening $g^2$ similar to the inverted V-shaped slot or opening $f^2$ in the arm $f$, and the corresponding end of the bar 13 passes therethrough, and the operation of the rotatable shaft $x^2$ as hereinafter described moves the rod or bar 13 forwardly and backwardly in the slots or openings $a^3$, and the operation of the arm $f$ which is accomplished by means of the handle member $f^6$ thereof also rotates the shafts $b^3$ and $x^2$.

Mounted in the slots or openings $a^5$ in the opposite end plates or members $a$ and in the arms $a^4$ thereof, said slots or openings being substantially L-shaped in form, is a shaft or rod $h$, the right hand end portion of which is provided inside of the corresponding end plate or member $a$ with an attachment $h^2$ to which is secured a chain or similar flexible device $h^3$, one end of which is connected with the arm $c^4$ of the shaft $b^3$, and the other end of which is connected with a spiral spring $h^4$ and is secured to the arm $c^2$ of said shaft and the chain $h^3$ is carried upwardly and forwardly and passed around a pulley or roller $h^5$ in the front end portion of the arm $a^2$ of the right hand end plate $a$, and said chain is also passed beneath a roller $h^6$ mounted on said end plate below and rearwardly of the L-shaped slot or opening $a^5$—$a^6$ therein.

Although the flexible device $h^3$ is described as a chain, it will be seen that it actually consists of two chains or similar devices, one of which is connected with the arm $c^4$ and with the attaching device $h^2$, and the other with said attaching device and the spring $h^4$.

The opposite end portion of the rod $h$ is also provided with an attaching device $i$ and a chain $i^2$ composed of two parts is connected with said attaching device, one part of said chain being connected with a spiral spring $i^3$ which is secured to the arm $d^2$ of the shaft $b^3$, the other part of said chain being secured to the arm $d^3$ of said shaft and the said chain $i^2$ or the parts thereof are passed around rollers $i^4$ and $i^5$, which correspond with the rollers $h^5$ and $h^6$ around which the chain $h^3$ or the parts thereof are passed, and with this construction the movement of the arm $f$ will move the rod or bar 13 forwardly and backwardly in the slots or openings $a^3$ of the end plates $a$ and will move the rod or shaft $h$ forwardly and backwardly in the slots or openings $a^5$—$a^6$ and will rotate the shaft $b^3$, and it will be observed that when the rod or shaft $h$ is in its innermost position it is also in its lowest position, and the upward movement of said rod or shaft also raises it and moves it forwardly into the position shown in Fig. 3, this operation being performed by pulling the arm $f$ backwardly and downwardly.

The pins or needles 12 and 14 connected with the bar 13 are arranged in series $e^3$, preferably of four each, and the central pins or needles or the front end portions thereof are in a plane lower than the side pins or needles as clearly shown in Figs. 6 and 9.

Rigidly secured to the shaft or rod $h$ and depending therefrom and spaced at regular intervals so as to be directly over the separate series $e^3$ of the pins or needles 12 and 14 are the spoon-shaped scoops 12' which extend downwardly and forwardly, and the points or lower ends of which terminate directly over the central portions of the separate series of pins or needles 12 and 14 when said pins or needles are in their normal positions. Beneath the shaft or rod $h$ and rigidly connected therewith by arms $k$ is a rod $k^2$ which is parallel with the rod or shaft $h$ and rearwardly of said shaft or rod $h$ and rigidly connected therewith by arms $m$ is a rod $m^2$, and the shaft or rod $h$, the rod $k^2$ and the rod $m^2$ form a frame, the rods $k^2$ and $m^2$ being shorter than the rod $h$, and in the operation of the machine the said frame of which the shaft or rod $h$ forms a part has a horizontal backward and downward movement, and an upward and forward movement.

Mounted on the rod $k^2$ and rotatable thereon are arms $n$, the end portions of which are directly upwardly and backwardly and in the ends of these arms is secured a horizontal rod $n^2$ to support the chocolate retaining devices which are provided at intervals with the downwardly directed wire fingers 16 which are arranged in pairs in the form of construction shown, and which are spaced to correspond with the scoops 12' and the separate series of needles or pins 12 and 14, and these wire fingers 16 are connected by a horizontal rod $n^4$, and in one position of the arms $n$ the fingers 16 or the ends thereof rest on the ends of the scoops 12', this position being shown in full lines in Figs. 1, 2, 3, 4, 6 and 9, but the arms 16 may be thrown upwardly and backwardly.

One of the end plates $a$ of the main frame is provided with a hook shaped device $o$, designed to normally hold the arm $f$ in its normal position, but said arm may be disconnected from said device whenever desired, and said device is not an essential element, and may or may not be employed.

The end plates or members $a$ are provided in the top thereof with outwardly directed flanges or supplemental plates $a^7$ which form handles by which the frame is manipulated.

In the use of my improved dipping frame the arm $f$ is moved forwardly so as to project the bar 13 with the needles 12 and 14 as shown in Figs. 1 and 4, and this operation moves the rod or shaft $h$ downwardly and backwardly into the position shown in Fig. 4, in which position the scoops 12' and fingers 16 also assume the position shown in said figure. In this position of the parts the nuts or candy cores to be coated are placed on the separate series of pins or needles as indicated in Fig. 6, and after the candies have been so placed the machine is grasped by means of the handles $a^7$ and moved downwardly and forwardly into a tank containing the liquid chocolate or other material and lifted therefrom. In this operation the needles 12 and 14, scoops 12' and fingers 16 pass into the liquid chocolate or other material and the nuts or candy cores 10 are covered with the same liquid chocolate or other material. The frame is then lifted out of the chocolate and agitated by hand in the usual manner so as to thoroughly distribute the chocolate over the nuts, candy cores or other articles, or this operation of shaking or agitating the frame may be accomplished by any suitably constructed machine, and this operation also removes all surplus chocolate both from the nuts, candy cores or the like and from the frame. At the end of this operation the frame may be placed on a table or other support, and a narrow strip, board or other support as shown at 17 in Figs. 3 and 6 is placed under the pins 12, and the arm $f^6$ is moved backwardly into the position of Fig. 12. In this position of Fig. 12 the bar 13 with the needles 12 and 14 is also moved backwardly as shown in said figure, and the nuts or candy cores 10 are dropped on to the plate, board or other support 17 as shown in said Figs. 2, 3 and 4. The arm $f$ or handle portion $f^6$ is now still further depressed, and this operation raises a shaft rod $b'$ into the position of Fig. 13 passing it from the position of Fig. 2, through the position of Fig. 3, to the position of Fig. 4, so that the chocolate contained in the spoons which is resting against the candy at the beginning of the stroke will be moved up, over and across the candy, so as to deposit it on the coated candy cores to leave the mark shown in Fig. 15.

In the foregoing description I have described one method of operating my improved dipping frame and discharging the coated candy cores or nuts therefrom, but other methods may be employed, and if desired the frame-work or similar device shown and described in my prior Patent No. 809,737 hereinbefore referred to may be employed.

The object of arranging the needle 12 and 14 series and having the front end portions of the side needles higher than the central needles is to insure the proper spacing of the nuts, candy cores or the like and to hold them in proper position during the process of dipping and agitation hereinbefore described, and my invention is not limited to the number of the pins in each series, nor to the number of the series. The scoops 12' because of their curved shape and because they are full of sticky chocolate also aid in locating the nuts or candy cores on the needles 12 and 14 and while I prefer to use the fingers 16 as herein described, my invention is not limited to such use.

It will be understood that the bar 13 and the pins or needles 12 and 14 constitute a support for the nuts or candy cores while in the machine or frame, and this support is capable of forward and backward movement as shown and described and when it is moved backwardly after the operation of "dipping" as hereinbefore described, the nuts or candy cores with the coating of chocolate thereon are deposited on the board or other support 17.

In carrying out this invention, details of construction may be varied from those shown, and yet the essence of the invention be retained; some parts might be employed without others, and new features thereof might be combined with elements old in the art in diverse ways, although the herein described type is regarded as embodying substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense.

It is furthermore desired to be understood that the language used in the following claims is intended to cover all the generic and specific features of the invention herein described, and all statements of the scope of the invention which as a matter of language might be said to fall therebetween.

I claim as my invention:

1. The herein described apparatus for coating and stroking confections, consisting of a support to hold the candy during its coating, and to allow the coating, a stroking device consisting of one or more spoons, a device for retaining coating within said spoons, stationarily located with relation thereto, and means for moving the spoon and its coating retaining means into contact with the candy core up and over the same, whereby the coating in the spoon may be drawn by its viscosity therefrom, and pass the coating retaining means.

2. A dipping frame of the class described provided with a forwardly and backwardly movable member having forwardly directed needles or pins connected therewith and arranged in series, the outer or side pins or needles of each series being in a plane higher than the central ones, and an upwardly and forwardly movable support placed over said needles or pins when in their normal positions and provided with downwardly directed scoops which correspond in number with and operate in connection with the separate series of pins or needles.

3. A dipping frame of the class described provided with a forwardly and backwardly movable member having forwardly directed needles or pins connected therewith and arranged in series, the outer or side pins or needles of each series being in a plane higher than the central ones, and an upwardly and forwardly movable support placed over said needles or pins when in their normal positions and provided with downwardly directed scoops which correspond in number with and operate in connection with the separate series of pins or needles, and a second support rotatably connected with the scoop support and provided with fingers adapted to rest in the points of said scoops.

4. A dipping frame of the class described provided with a forwardly and backwardly movable member having forwardly directed needles or pins connected therewith and arranged in series, the outer or side pins or needles of each series being in a plane higher than the central ones, and an upwardly and forwardly movable support placed over said needles or pins when in their normal positions and provided with downwardly directed scoops which correspond in number with and operate in connection with the separate series of pins or needles, and a second support rotatably connected with the scoop support and provided with fingers adapted to rest in the points of said scoops, said finger support being adapted to be turned backwardly and held out of operative position.

Signed at New York city, this 26th day of February, 1910.

PANAYIOTIS PANOULIAS.

Witnesses:
  F. WARREN WRIGHT,
  BENJAMIN OKSENKRUG.

---

Copies of this patent may be obtained for five cents each, by addressing the "Commissioner of Patents, Washington, D. C."